US007961981B2

(12) United States Patent
Berg

(10) Patent No.: US 7,961,981 B2
(45) Date of Patent: Jun. 14, 2011

(54) METHOD OF OBTAINING A THREE-DIMENSIONAL IMAGE OF THE OUTER EAR CANAL

(75) Inventor: Christian Berg, Uerikon (CH)

(73) Assignee: Phonak AG, Stafa (CH)

( * ) Notice: Subject to any disclaimer, the term of this patent is extended or adjusted under 35 U.S.C. 154(b) by 1800 days.

(21) Appl. No.: 10/997,002

(22) Filed: Nov. 24, 2004

(65) Prior Publication Data

US 2006/0133634 A1 Jun. 22, 2006

(51) Int. Cl.
*G06K 9/36* (2006.01)
*G06K 9/00* (2006.01)

(52) U.S. Cl. .......................... 382/286; 382/117; 356/603

(58) Field of Classification Search .................. 382/286, 382/115–118; 356/603
See application file for complete search history.

(56) References Cited

U.S. PATENT DOCUMENTS 6,076,928 A * 6/2000 Fateh et al. .................... 351/203
6,289,113 B1 * 9/2001 McHugh et al. .............. 382/117
6,341,016 B1 * 1/2002 Malione ......................... 356/603
6,342,927 B1 * 1/2002 Kimoto et al. ................. 348/569
6,377,699 B1 * 4/2002 Musgrave et al. ............ 382/117
2003/0185412 A1 * 10/2003 Gebert et al. ................. 381/312
2003/0223083 A1 * 12/2003 Geng ............................. 356/603
2004/0201741 A1 * 10/2004 Ban ............................. 348/231.3
2005/0286743 A1 * 12/2005 Kurzweil et al. ............. 382/114

* cited by examiner

*Primary Examiner* — Hadi Akhavannik
(74) *Attorney, Agent, or Firm* — Pearne & Gordon LLP

(57) ABSTRACT

The present invention relates to a method of obtaining a three-dimensional (3D) image of the outer ear canal. This will be achieved by scanning at least the outer ear canal by use of a video camera, transmitting the image data of the video camera through a connection to a service provider, analyzing the image data by the service provider with respect of acceptance and integrity, transmitting status information back to the video camera and further processing/converting accepted image data into 3D geometric data. Thus, video image data will be retrieved from the part of interest of the ear and the quality and integrity of this information will be checked by the service provider prior to storing and process/converting this data into 3D imaging data that can be used for an automated manufacturing process for the outer shape of hearing devices, hearing protection devices or hearing aid shells.

20 Claims, 1 Drawing Sheet

METHOD OF OBTAINING A THREE-DIMENSIONAL IMAGE OF THE OUTER EAR CANAL

BACKGROUND OF THE INVENTION

This invention relates to a method of obtaining a three-dimensional (3D) image of the outer ear canal.

The present invention further relates to a hearing device, hearing protection device or hearing aid.

To achieve a proper fit of a hearing device to be carried in the ear canal it is essential to rely on reliable and exact data of the shape of the outer ear canal and at least a part of the concha or pinna respectively. The data will have to cover a significant part of the outer ear canal especially for hearing instruments for hearing impaired patients as well as for custom-fitted hearing protection devices to be worn by people working in loud environments.

Such data is usually obtained by use of a silicon based ear impression that may successively be scanned or sampled to build the individual shape of such hearing devices or instruments. This process is well established but suffers from being carried out manually only by specialized persons. Furthermore such a process is not comfortable for the person concerned and has to be performed at a special location, usually at the location of the service provider for hearing devices.

New attempts have been made with direct scanning of the ear, but these scanning technologies are currently not feasible under commercial conditions.

In US 2003 139658 A1 a method for scanning the ear canal by use of a video imaging system for the reconstruction of the geometry of the inner surface of a cavity such as the ear canal is described. Even tough a relatively low cost video scanning apparatus may be used for this purpose, the method will have to be performed by a specialist usually at his own location, e.g. the location of the service provider or the ear specialist.

SUMMARY OF THE INVENTION

It is an object of the present invention to provide a method for an easy and quick scanning of the shape of the outer ear that may be performed even by a non skilled person and to obtain reliable data for the reconstruction of the shape of the outer ear.

The present invention provides a method of obtaining a 3D image of the outer ear by scanning at least the outer ear canal by use of a video camera; transmitting the image data of the video camera through a connection to a service provider; analyzing the image data by the service provider with respect of acceptance and integrity; transmitting status information back to the video camera and further processing/converting accepted image data into 3D geometric data. Thus, video image data will be retrieved from the part of interest of the ear and the quality and integrity of this information will be checked by the service provider prior to storing and process/converting this data into 3D imaging data that can be used for an automated manufacturing process for the outer shape of hearing devices, hearing protection devices or hearing aid shells.

In one embodiment the method will be performed by communicating session completion back to video camera. Thus the person handling the video camera or a computer program controlling the video camera will be informed about the completion of the session.

In another embodiment the method will be performed by scanning the outer ear canal with a video streaming camera by the person concerned himself. It will thus not be necessary to have a skilled person or a specialist for taking the picture of the ear or a 3D model of the ear. It may even be performed by the user or future user of this device himself.

In another embodiment the method will be performed by using a video camera linked directly to a computer device comprising a program for guiding the recording operation of the video camera. Such a program, e.g. software running on the computer device, may communicate immediately and online with the operator of the video camera and transmit the result of the analysis of the video data by the service provider back to the operator of the camera.

In another embodiment the method will be performed by transmitting the image data as a video stream to a host computer of the service provider. The data may be automatically collected and analyzed by a host computer located remotely from the camera, e.g. at the service provider's premises. Thus an immediate and accurate communication between the video camera, the operator of the video camera and the service provider may be established.

In a further embodiment the method will be performed by providing an anatomy analysis application as a host application at the service provider. Such an application may perform the task of analyzing the video data to be correct and stable to produce an exact model of the ear or the ear canal concerned.

In a further embodiment the analysis application comprises a model of the ear anatomy, a database of different ear shapes and a 3D modeling module. Although the shape of each human ear differs from any other human ear, certain types of ear shape may be collected and stored in a database. By comparing the online data received by the actual scanning of a human ear with such a database, the analyzing application may at least roughly estimate if it receives data from a human ear and not from any other object. This may be the case if the video camera is not positioned in front of a human ear or if the focus of the video camera is directed to another object but not to the entrance of the ear canal within the concha of the human ear. If this is detected, the application may produce appropriate status information for the operator of the video camera, so that the operator changes e.g. his aiming and/or focus of the video camera. If on the other hand the data seems to be correct, the application may collect and store this video data for modeling 3D positioning data to be used in automated production processes for e.g. hearing device shells.

In another embodiment the method will be performed by analyzing the data in a closed loop control system that will send continuously status information to the operator of the video camera. This enables the operator to handle the video camera without having special skill or being trained for this special task. The status information may lead the operator to a correct setting of the video camera to obtain the best possible quality of the video signal or video stream and further to an optimized positioning of the video camera with respect to the ear.

In another embodiment the method will be performed by also scanning a part of the concha of the ear, at least the part around the entrance to the outer ear canal. A perfect fit of the hearing device may be achieved by forming the outer shape of the device not only according to the outer ear canal but also according to the part of the concha around the entrance of the outer ear canal.

In a further embodiment the method will be performed by transmitting status information about the position of the video camera, camera specific settings such as contrast and brightness, background issues and foreign body issues. As already set forth above, by transmitting specific status information to the operator of the video camera, a high quality of the video stream and thus an exact model of the shape of the ear canal and/or concha may be easily achieved. Specific setting data may be stored in a database at the service provider and may be transmitted after identification of the specific video camera being used.

In one embodiment of this method the transmitted status information will be provided to the video camera to produce guiding information for the user of the video camera. The status information received by the service provider may be analyzed by a local computer program which converts the information into information to be displayed directly within the video camera concerned. The information may be displayed within the search screen of the video camera to directly inform the operator about the task to be performed. Such a system may be used by third party operators which will record data of the ear of another person.

In another embodiment of this method picture information related to the guiding information will be produced to be shown on a monitor or screen. By providing such information, the operator will be enabled to perform the video operation on his own ear. He may handle the video camera with one hand and be faced towards the monitor or screen to receive the status information. The information may be transferred into easily readable pictures for guiding the operator through the video monitoring process until it is finished. The result of the process may further be reproduced on the same monitor or screen, i.e. the picture of the 3D model generated by the service provider may be shown on the monitor or screen. The operator may then confirm an ordering process for manufacturing a hearing device shell with this data or possibly cancel the ordering process.

In a further embodiment of this method speech or other sound information related to the guiding information will be produced to be emitted by loudspeakers. To be independent from picture information concerning the guiding process the information may be transferred into speech sound information to acoustically guide the operator through the monitoring process.

The present invention further provides a hearing device, hearing protection device or hearing aid with a shell or casing whose shape is at least partially manufactured from a 3D image of the outer ear obtained by scanning at least the outer ear canal by use of a video camera; transmitting the image data of the video camera through a direct connection to a service provider; analyzing the image data by the service provider with respect of acceptance and integrity; transmitting status information back to the video camera; converting accepted image data into 3D geometric data.

Such a hearing device, hearing protection device or hearing aid may be produced economically with an individually shaped shell of the device that will perfectly fit into the ear. Thus the risk that such a device will hurt in the ear or will easily fall out of the ear will be minimized or even omitted.

The invention therefore provides elimination of long staying visits at a specialist location, reduction of ordering and processing time as well as decreasing the production costs.

It will thus be possible even for people living at great distances to specialists or service centers to receive custom made, individually shaped hearing devices, hearing protection devices or hearing aids at reasonable costs.

DESCRIPTION OF THE DRAWINGS

For purpose of facilitating and understanding of the invention, there is illustrated in the accompanying drawings a preferred embodiment thereof to be considered in connection with the following description. Thus the invention may be readily understood and appreciated.

DESCRIPTION OF A PREFFERED EMBODIMENT

Figure 1:
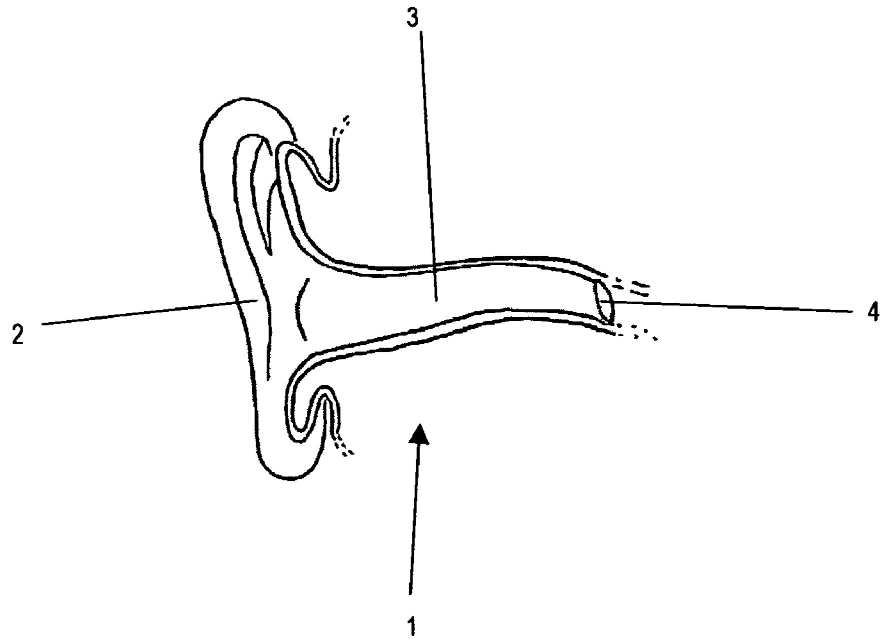
FIG. 1 is a schematic cross sectional view of the human ear.

Referring to FIG. 1, the human outer ear 1 is shown in a schematic cross sectional view with the pinna or concha 2 and the outer ear canal 3 ending at the ear drum 4. The shape of the concha 2 and the ear canal 3 varies from each human person even though some basic forms may be classified. For a perfect fit of an in-the-ear hearing device that will be positioned at the entrance of the outer ear canal 3 and therefore relies at least on the transition part of the outer ear canal 3 to the concha 2, the shape of this in-the-ear hearing device has to be perfectly adapted to the shape of the outer ear canal 3 and the part of the concha 2 concerned. Even slight differences between the shapes of the respective hearing devices and the outer ear canals 3 may cause pain or discomfort for the hearing device wearer.

Figure 2:
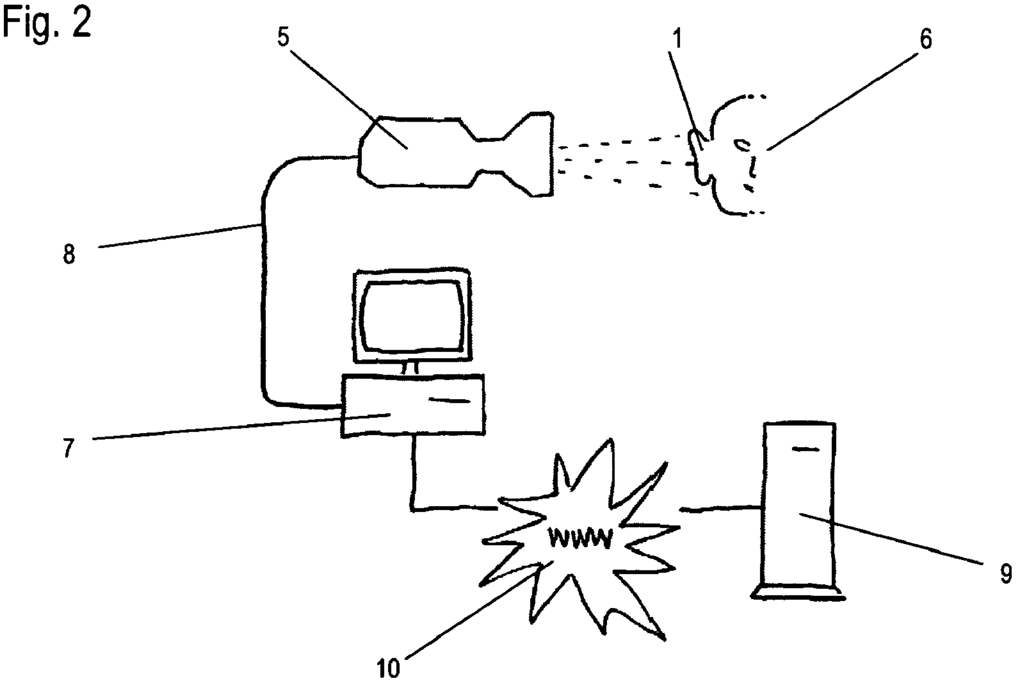
FIG. 2 is a schematic view of the inventive method to obtain the 3D data of the shape of the outer ear canal and at least a part of the cochla.

FIG. 2 shows a schematic diagram of the functionality of the inventive method for obtaining a 3D image of the areas of the outer ear canal 3 and the concha 2 to individually customize the shape of a hearing device to be inserted into the outer ear canal 3 concerned.

A video camera 5 is positioned in close proximity of the ear 1 of the potential wearer 6 of a hearing device to be individually shaped. The video data will be transferred directly to a computer device 7, either by wire 8 or by wireless communication means such as infrared or radio communication.

The video camera 5 may advantageously be positioned by the wearer 6 himself without the need of any skilled or specialized person.

The video data, for instance in form of a video stream, will then be handled by a recording program executed on the computer device 7 and transmitted online to a host 9. The transmission will be performed online and in real time via a broadband internet connection 10.

The host 9 will communicate with the computer device 7 and transmit status information to be handled by the recording program as set forth below.

To achieve a usable video signal or video stream respectively, the video camera has to be positioned in a certain manner and position in front of the ear. Therefore, the host 9 will send operating instructions to the recording program in the computer device 7, which will transfer those instructions into guidance pictures shown on the monitor 10 of the computer device 9 and/or speech instructions. Those instructions are used to guide the user of the video camera 5 for its operation. Thus, the video camera will be initialized, calibrated and set to an appropriate position. Further, the specific settings of the video camera 5 such as video streaming speed and other camera specific settings may be checked and a changing of the settings may be requested. Other topics such as background, illumination or foreign bodies may be checked and the user may be asked to change them.

In order to analyze the online video stream, the host 9 will run an anatomy analysis application using the model of human ear anatomy with a database of ear shapes, critical dimension settings for the recording and a 3D modeling module for completing the recorded video stream into a 3D data model to be used in a production process for modeling the outer shape of hearing aids, hearing protection devices or hearing devices respectively.

The host 9 will be further designed to be able to run multiple concurrent recording sessions. The 3D data model may be stored in a web-exchangeable format to be transmitted to production locations anywhere in the world and as a feedback result to the computer device 7 to be shown to the user of the video camera 5 immediately after the session.

To accomplish this operation, it may be sufficient to use a web-cam as video camera 5, which is a low cost tool and may be handled practically without any specific knowledge about video technology. It thus will be possible for the user or future user of a hearing aid, hearing protection devices or hearing device to record and transfer 3D data of the shape of his ear to enable the production of a custom-shaped hearing aid, hearing protection devices or hearing device which will perfectly fit in his ear without the need of having a session at the location of a specialist. Such a service may be offered on a 24 hour basis and in case of difficulties, a personal support service may be installed as well. A significant reduction of cost and saving of time in the production of custom-shaped hearing aids, hearing protection devices or hearing devices may thus be achieved for the benefit of the wearer of such devices.

Such individually shaped hearing aids, hearing protection devices or hearing devices respectively provide good comfort for the wearer and are less prone to falling out of the ear. As the standard custom-shaping process is often too expensive, time consuming and uncomfortable, most of the wearers of such devices, especially of in-the-ear hearing devices, use standard products with only a few standardized shapes and have to put up with the mentioned disadvantages.

What is claimed is:

1. Method of obtaining a 3D image of an outer ear, comprising the steps of:

scanning at least the outer ear canal by use of a video camera;

transmitting image data of the video camera through a connection to a service provider;

analyzing the image data by the service provider with respect of acceptance and integrity;

transmitting status information back to the video camera, the status information comprising a plurality of user guidance instructions instructing a user on use of the video camera, the transmitted user guidance instructions resulting from the step of analyzing the image data with respect of acceptance and integrity, wherein, when the analyzed image data is not acceptable, the transmitted user guidance instructions include a user direction concerning at least one of a video speed setting, a brightness setting, a contrast setting, illumination, foreign body issues, and background issues; and processing/converting accepted image data into 3D coordinate data.

2. Method according to claim 1, further comprising a step of communicating a session completion back to the video camera.

3. Method according to claim 1, wherein the scanning step comprises scanning the outer ear canal with a video streaming camera by the person concerned.

4. Method according to claim 1, wherein the video camera is linked directly to a computer device comprising a program for guiding the recording operation of the video camera.

5. Method according to claim 1, wherein the step of transmitting the image data comprises transmitting the image data as a continuous video stream to a host computer of the service provider.

6. Method according to claim 1, further comprising a step of providing an anatomy analysis application as a host application at the service provider.

7. Method according to claim 6, wherein the analysis application comprises a model of the ear anatomy, a database of different ear shapes and a 3D modeling module.

8. Method according to claim 1, further comprising a step of analyzing the data in a closed loop control system that will send continuously the status information to the operator of the video camera.

9. Method according to claim 1, wherein the scanning step comprises scanning a part of the concha of the ear, at least the part around the entrance to the outer ear canal.

10. Method according to claim 1, further comprising a step of producing picture information related to the user guidance instructions to be shown on a monitor or screen.

11. Method according to claim 1, further comprising a step of producing speech or other sound information related to the user guidance instructions.

12. Hearing device, hearing protection device or hearing aid with a shell or casing having a shape that is at least partially manufactured from a 3D image of the outer ear, wherein the 3D image is obtained by a method comprising the steps of:

scanning at least the outer ear canal by use of a video camera;

transmitting image data of the video camera through a connection to a service provider;

analyzing the image data by the service provider with respect of acceptance and integrity;

transmitting status information back to the video camera, the status information comprising a plurality of user guidance instructions instructing a user on use of the video camera, the transmitted user guidance instructions resulting from the step of analyzing the image data with respect of acceptance and integrity, wherein, when the analyzed image data is not acceptable, the transmitted user guidance instructions include a user direction concerning at least one of a video speed setting, a brightness setting, a contrast setting, illumination, foreign body issues, and background issues; and converting accepted image data into 3D coordinate data.

13. Hearing device, hearing protection device or hearing aid according to claim 12, wherein the method further comprises a step of communicating the session completion back to the video camera.

14. Hearing device, hearing protection device or hearing aid according to claim 12, wherein the video camera is linked to a computer device comprising a program for guiding the recording operation of the video camera.

15. Hearing device, hearing protection device or hearing aid according to claim 12, wherein the method further comprises a step of providing an anatomy analysis application as a host application at the service provider.

16. Hearing device, hearing protection device or hearing aid according to claim 15, wherein the analysis application comprises a model of the ear anatomy, a database of different ear shapes and a 3D modeling module.

17. Method according to claim 1, further comprising the steps of displaying picture information related to the user direction, and audibly playing sound information related to the user direction.

18. Method according to claim 17, wherein the step of audibly playing sound information includes audibly playing speech.

19. Hearing device, hearing protection device or hearing aid according to claim 12, wherein the method further comprises the steps of displaying picture information related to the user direction, and audibly playing sound information related to the user direction.

20. Hearing device, hearing protection device or hearing aid according to claim 19, wherein the step of audibly playing sound information includes audibly playing speech.

* * * * *